US010999604B2

(12) United States Patent
Chiang et al.

(10) Patent No.: US 10,999,604 B2
(45) Date of Patent: May 4, 2021

(54) ADAPTIVE IMPLICIT TRANSFORM SETTING

(71) Applicant: MediaTek Inc., Hsinchu (TW)

(72) Inventors: Man-Shu Chiang, Hsinchu (TW); Chih-Wei Hsu, Hsinchu (TW)

(73) Assignee: MediaTek Inc.

(*) Notice: Subject to any disclaimer, the term of this patent is extended or adjusted under 35 U.S.C. 154(b) by 0 days.

(21) Appl. No.: 16/382,173

(22) Filed: Apr. 11, 2019

(65) Prior Publication Data
US 2019/0320204 A1 Oct. 17, 2019

Related U.S. Application Data

(60) Provisional application No. 62/665,582, filed on May 2, 2018, provisional application No. 62/657,100, filed on Apr. 13, 2018.

(51) Int. Cl.
H04N 19/61 (2014.01)
H04N 19/52 (2014.01)
(Continued)

(52) U.S. Cl.
CPC ........... *H04N 19/61* (2014.11); *H04N 19/159* (2014.11); *H04N 19/176* (2014.11); *H04N 19/52* (2014.11)

(58) Field of Classification Search
CPC ...... H04N 19/61; H04N 19/52; H04N 19/159; H04N 19/176; H04N 19/157; H04N 19/12
(Continued)

(56) References Cited

U.S. PATENT DOCUMENTS 10,419,754 B1 9/2019 Zhao et al.
2011/0090952 A1 4/2011 Cohen et al.
(Continued)

FOREIGN PATENT DOCUMENTS

EP 2942957 A1 11/2015
WO WO 2009113276 A1 9/2009
WO WO 2018064517 A1 4/2018

OTHER PUBLICATIONS

Taiwan Intellectual Property Office, Office Action for Taiwan Patent Application No. 108112931, dated Mar. 13, 2020.
(Continued)

*Primary Examiner* — Marnie A Matt
(74) *Attorney, Agent, or Firm* — Han IP PLLC; Andy M. Han

(57) ABSTRACT

A video coder that implicitly signals or decides transform settings based on intra prediction settings is provided. The video coder receives input data associated with a current block. The video coder determines a current intra prediction mode for the current block and maps the current intra prediction mode to a target transform mode. In one example, the video coder encodes the current block by performing a transform operation according to the target transform mode on the prediction residuals of the current block generated according to the current intra prediction mode. In another example, the video coder decodes the current block by performing an inverse transform operation according to the target transform mode on the coded prediction residuals of the current block, in which the coded prediction residuals is derived from the bitstream and is generated according to the current intra prediction mode.

13 Claims, 11 Drawing Sheets

(51) Int. Cl.
*H04N 19/159* (2014.01)
*H04N 19/176* (2014.01)

(58) Field of Classification Search
USPC .................................................. 375/240.18
See application file for complete search history.

(56) References Cited

U.S. PATENT DOCUMENTS

| | | | |
|---|---|---|---|
| 2011/0286520 A1* | 11/2011 | Xu | H04N 19/147 |
| | | | 375/240.12 |
| 2012/0057630 A1 | 3/2012 | Saxena et al. | |
| 2013/0034153 A1 | 2/2013 | Song et al. | |
| 2015/0139308 A1* | 5/2015 | Lee | H04N 19/61 |
| | | | 375/240.03 |
| 2016/0219278 A1 | 7/2016 | Chen et al. | |
| 2018/0070079 A1* | 3/2018 | Lee | H04N 19/157 |
| 2019/0238880 A1 | 8/2019 | Lee | |
| 2019/0246134 A1 | 8/2019 | Abe et al. | |
| 2019/0281321 A1* | 9/2019 | Zhao | H04N 19/61 |

OTHER PUBLICATIONS

USPTO, Office Action for Patent Application No. 16382167, dated Mar. 5, 2020.

China National Intellectual Property Administration, International Search Report and Written Opinion or International Patent Application No. PCT/CN2019/082537, dated Jul. 2, 2019.

\* cited by examiner

ADAPTIVE IMPLICIT TRANSFORM SETTING

CROSS REFERENCE TO RELATED PATENT APPLICATION(S)

The present disclosure is part of a non-provisional application that claims the priority benefit of U.S. Provisional Patent Application No. 62/657,100, filed on 13 Apr. 2018, and U.S. Provisional Patent Application No. 62/665,582, filed on 2 May 2018. Contents of above-listed application(s) are herein incorporated by reference.

TECHNICAL FIELD

The present disclosure relates generally to video processing. In particular, the present disclosure relates to implicit signaling of transform settings based on intra prediction settings.

BACKGROUND

Unless otherwise indicated herein, approaches described in this section are not prior art to the claims listed below and are not admitted as prior art by inclusion in this section.

High-Efficiency Video Coding (HEVC) is a new international video coding standard developed by the Joint Collaborative Team on Video Coding (JCT-VC). HEVC is based on the hybrid block-based motion-compensated Discrete Cosine Transform (DCT) coding architecture. The basic unit for compression, termed coding unit (CU), is a 2N×2N square block, and each CU can be recursively split into four smaller CUs until the predefined minimum size is reached. Each CU contains one or multiple prediction units (PUs). For each PU, either Intra Prediction or Inter Prediction can be used. While temporal reconstructed reference frames are used for predictions in Inter Prediction modes, spatial reconstructed pixels within the same frame are used for Intra Prediction modes. After prediction, the predicted residues for one CU are divided into transform units (TUs) and coded using transform and quantization. Like many other precedent standards, HEVC adopts Discrete Cosine Transform type II (DCT-II) as its core transform because it has a strong "energy compaction" property.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video encoder that implicitly signals transform settings based on intra prediction settings. In some embodiments, a video encoder receives a block of pixels of a video picture to be coded as a current block. The video encoder performs an intra prediction operation for the current block according to an intra prediction setting and generating prediction residuals of the current block. The intra prediction setting selects a current intra prediction mode from a plurality of intra prediction modes for the current block. The video encoder maps the current intra prediction mode to a target transform mode. The video encoder encodes the current block in a bitstream by performing a transform operation on the prediction residuals of the current block according to the target transform mode.

Some embodiments of the disclosure provide a video decoder that implicitly decides transform settings based on intra prediction settings. In some embodiments, a video decoder receives a bitstream comprising coded prediction residuals of a current block of a video picture. The video decoder determines a current intra prediction mode from a plurality of intra prediction modes for the current block according to an intra prediction setting and maps the current intra prediction mode to a target transform mode. The video decoder decodes the current block by performing an inverse transform operation on the coded prediction residuals of the current block according to the target transform mode to generate prediction residual of the current block and by reconstructing the current block based on the prediction residual and a set of prediction pixels of the current block, in which set of prediction pixels of the current block is generated by performing an intra prediction operation for the current block according to the current intra prediction mode.

In some embodiments, a collection of intra prediction modes are assigned with a particular transform mode, such that the target transform mode is the particular transform mode when the current intra prediction mode is in the collection of intra prediction modes. The collection of intra prediction modes may be defined by a fixed expression, such that different blocks with different block sizes have different fixed expression for defining the collection of intra prediction modes, or such that different fixed expressions are used to assign intra prediction modes in different numerical ranges with transform modes. In some embodiments, intra prediction modes in a most probable mode (MPM) list of the current block are assigned with a particular transform mode. In some embodiments, an intra prediction mode indicative of uniform block texture, such as DC mode, is mapped to a particular transform mode.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Some embodiments of the disclosure provide a video coder that implicitly signal transform setting(s) according to a set of predefined rules. Specifically, the video coder may derive a transform mode and/or other transform settings based on intra prediction settings that are explicitly signaled in a bitstream. The transform mode may specify a vertical transform type and horizontal transform type that are selected multiple different transform types.

Figure 1:
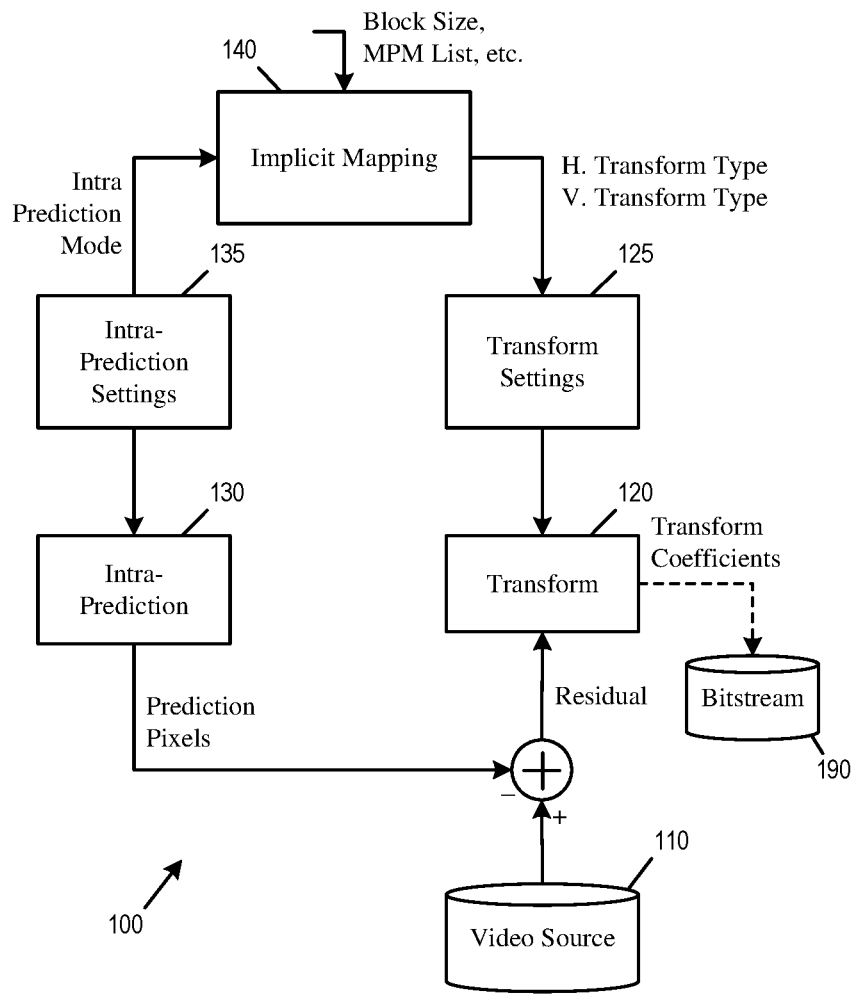
FIG. 1 conceptually illustrates implicit determination of transform settings based on prediction settings in a video encoder.

FIG. 1 conceptually illustrates implicit determination of transform settings based on prediction settings in a video encoder 100. The video encoder 100 receives raw pixels from a video source 110. The raw pixels belong to video pictures of a video sequence. The video encoder 100 divides the raw pixels belonging to a video picture into pixel blocks (e.g., CUs) to be encoded into a bitstream 190 as syntax elements.

As illustrated, the video encoder 100 includes a transform module 120, a set of transform settings 125, an intra prediction module 130, a collection of intra prediction settings 135, and an implicit mapping module 140. In some embodiments, the modules 120-140 are modules of software instructions being executed by one or more processing units (e.g., a processor) of a computing device or electronic apparatus. In some embodiments, the modules 120-140 are modules of hardware circuits implemented by one or more integrated circuits (ICs) of an electronic apparatus. Though the modules 120-140 are illustrated as being separate modules, some of the modules can be combined into a single module.

When coding a block of pixels (the current block), the intra prediction module 130 generates a set of prediction pixels by referencing pixels neighboring the current block in different directions. The generated prediction pixel is subtracted from raw pixel values of the current block to produce a set of residuals, and the residuals are transformed into transform coefficients by the transform module 120. The transform coefficients are then entropy coded as syntax element of the bitstream 190.

The transform module 120 may include multiple different transform engines, such as transform engines for DCT-II, DST-VII, DCT-VIII, DST-I, and DCT-V transform types or any subset of the above types. The transform settings 125 select which transform engine is used to transform the residual values into transform coefficients for the current block. In some embodiments, the transform settings 125 specify a horizontal transform type and a vertical transform type.

The intra prediction module 130 performs intra prediction by referencing pixels within the current video picture. The operations of the intra prediction module 130 are controlled by the intra prediction settings 135, which specifies an intra prediction mode that is selected from DC mode, planar mode, and multiple different directional/angular modes. Intra prediction modes are described in greater detail in Section II below.

The intra prediction settings 135 may be determined by a rate distortion control engine (not illustrated) of the video encoder 100. The intra prediction settings 135 may be explicitly coded as syntax elements in the bitstream 190. On the other hand, the transform settings 125 are derived or mapped from the intra prediction settings 135 and not coded in the bitstream as syntax elements. In other words, the intra prediction settings 135 are explicitly signaled while the transform settings 125 are implicitly signaled.

The implicit mapping module 140 maps the intra prediction settings 135 into transform settings 125. In some embodiments, the implicit mapping module 140 defines a collection of intra prediction modes according to a predetermine criteria. The defined collection of intra prediction modes are assigned with or mapped to a transform group or a transform mode according to an Adaptive Multiple Transform (AMT) Scheme or a multiple transform selection (MTS) scheme. AMT specifies the horizontal and vertical transform types for different transform groups and different transform modes. MTS specifies the horizontal and vertical transform types for different transform modes. AMT and MTS schemes are described in greater detail in Section I below.

When encoding the current block by a particular intra prediction mode, the implicit mapping module 140 determines whether the particular intra prediction mode falls within the defined collection of intra prediction modes. If so, the implicit mapping module 140 provides a horizontal type and a vertical transform type based on the transform group and/or transform mode that the defined collection of intra prediction modes is assigned with or mapped to. In some embodiments, the implicit mapping module 140 defines multiple collections of intra prediction modes and maps each defined collection of intra prediction modes to a different transform group or transform mode. In some embodiments, the mapping of intra prediction settings to transform settings is based on predefined functions. In some embodiments, the mapping of intra prediction settings to transform settings is further based on other properties of the current block, such as the size/width/height of the current block. In some embodiments, the implicit mapping module 140 defines the collection of intra prediction modes based on a list of most probable modes (MPM) that is identified based on information (e.g., prediction modes) of the blocks neighboring the current block. The MPM are described in Section III below. The mapping of intra prediction settings to transform settings is described in greater detail in Section IV below.

Figure 2:
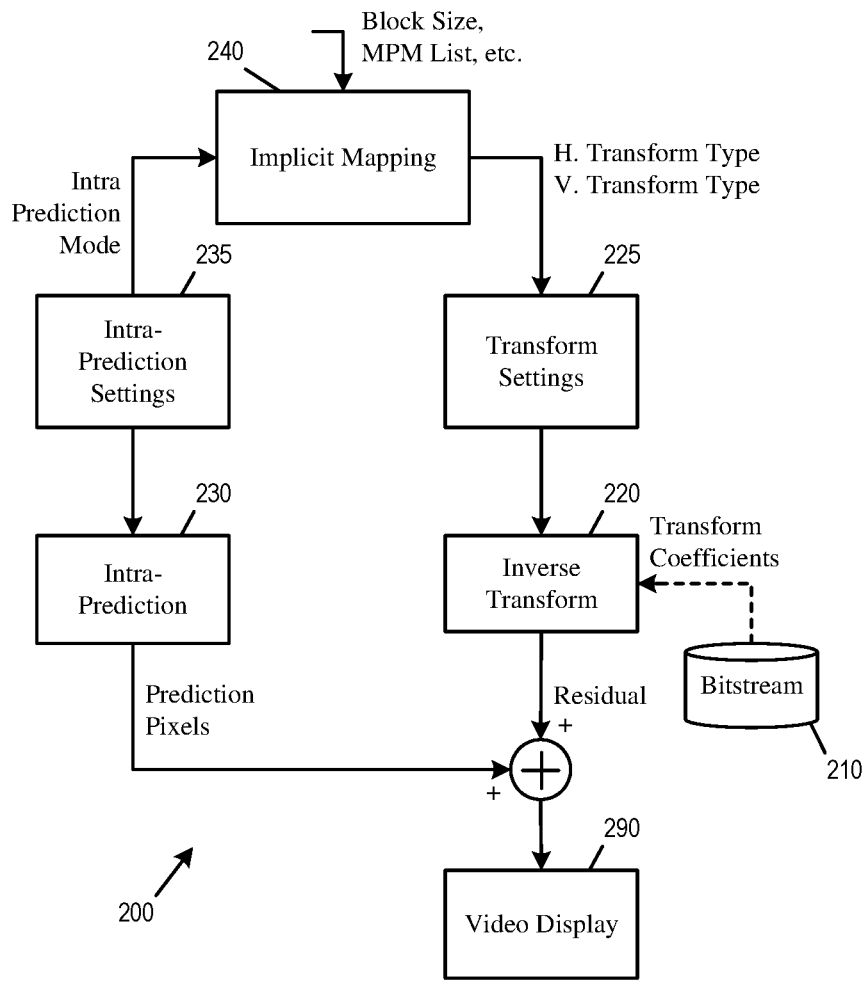
FIG. 2 conceptually illustrates implicit determination of transform settings based on intra prediction settings in a video decoder.

FIG. 2 conceptually illustrates implicit determination of transform settings based on intra prediction settings in a video decoder 200. The figure illustrates the video decoder 200 receiving syntax elements of a bitstream 210. The video decoder 200 decodes the syntax elements to reconstruct video pictures of a video sequence for transmission or display.

As illustrated, the video decoder 200 includes an inverse transform module 220, a set of transform settings 225, an intra prediction module 230, a collection of intra prediction settings 235, and an implicit mapping module 240. In some embodiments, the modules 220-240 are modules of software instructions being executed by one or more processing units (e.g., a processor) of a computing device or electronic apparatus. In some embodiments, the modules 220-240 are modules of hardware circuits implemented by one or more integrated circuits (ICs) of an electronic apparatus. Though the modules 220-240 are illustrated as being separate modules, some of the modules can be combined into a single module.

When coding a block of pixels (the current block), the intra prediction module 230 generates a set of prediction pixels by referencing pixels neighboring the current block in different directions. The generated prediction pixel is added with a set of residual values that are produced by the inverse transform module 220 based on transform coefficients. The transform coefficients are entropy decoded from syntax elements of the bitstream 210.

The inverse transform module 220 may include multiple different transform engines, such as transform engines for DCT-II, DST-VII, DCT-VIII, DST-I, and DCT-V transform types, or any subset of the above types. The transform settings 125 select which transform engine is used to inverse transform the transform coefficients into residual values for the current block. In some embodiments, the transform settings 225 specifies a horizontal transform type and a vertical transform type.

The intra prediction module 230 performs intra prediction by referencing pixels within the current video picture. The operations of the intra prediction module 230 are controlled by the intra prediction settings 235, which specifies an intra prediction mode that is selected from DC mode, planar mode, and multiple different directional/angular modes. Intra prediction modes are described in greater detail in Section II below.

The intra prediction settings 235 are based on syntax elements parsed from the bitstream. On the other hand, the transform settings 225 are derived or mapped from the intra prediction settings 235 and not coded in the bitstream as syntax elements. In other words, the intra prediction settings 235 are explicitly signaled while the transform settings 225 are implicitly signaled.

The implicit mapping module 240 maps the intra prediction settings 235 into transform settings 225. In some embodiments, the implicit mapping module 240 defines a collection of intra prediction modes according to a predetermine criteria.

The defined collection of intra prediction modes are assigned with or mapped to a transform group or a transform mode according to an Adaptive Multiple Transform (AMT) Scheme or a multiple transform selection (MTS) scheme. AMT specifies the horizontal and vertical transform types for different transform groups and different transform modes. MTS specifies the horizontal and vertical transform types for different transform modes. AMT and MTS schemes are described in greater detail in Section I below.

When decoding the current block by a particular intra prediction mode, the implicit mapping module 240 determines whether the particular intra prediction mode falls within the defined collection of intra prediction modes. If so, the implicit mapping module 240 provides a horizontal transform type and a vertical transform type based on the transform group and/or transform mode that the defined collection of intra prediction mode is assigned with or mapped to. In some embodiments, the implicit mapping module 240 defines multiple collections of intra prediction modes and maps each defined collection of intra prediction modes to a different transform group or transform mode. In some embodiments, the mapping of intra prediction settings to transform settings is based on predefined functions. In some embodiments, the mapping of intra prediction settings to transform settings is further based on other properties of the current block, such as the size/width/height of the current block. In some embodiments, the implicit mapping module 240 defines the collection of intra prediction modes based on a list of most probable modes (MPM) that is identified based on information (e.g., prediction modes) of the blocks neighboring the current block. The MPM are described in Section III below. The mapping of intra prediction settings to transform settings is described in greater detail in Section IV below.

I. Transform Modes

In some embodiments, an Adaptive Multiple Transform (AMT) scheme is used to define the transform settings for residual coding for both intra and inter coded blocks. AMT scheme uses transform modes selected from the DCT/DST families or transform types, including Discrete Sine Transform type VII (DST-VII), Discrete Cosine Transform type VIII (DCT-VIII), Discrete Sine Transform type I (DST-I), and Discrete Cosine Transform Type V (DCT-V).

In some embodiments, multiple transform modes used in AMT scheme are divided into Transform Group 1 and Transform Group 2. The number of transform modes in Transform Group 1 is denoted as A, where A is a positive integer. The number of transform modes in Transform Group 2 is denoted as B, where B is a positive integer. A plus B is equal to the total number of transform modes. In some embodiments, a transform mode may assign one transform type for horizontal transform and one transform type for vertical transform.

Figure 3A:
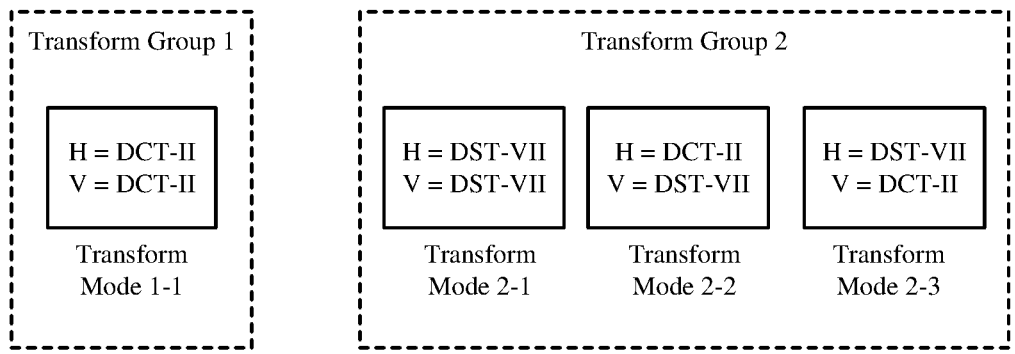
FIG. 3A illustrates an example Adaptive Multiple Transform (AMT) scheme.

FIG. 3A illustrates an example AMT scheme 300A. As illustrates, the example AMT scheme 300A use only transform types DCT-II and DST-VII, and there is one transform mode in Transform Group 1 and there are three transform modes in Transform Group 2. For Transform Group 1, the one transform mode (mode 1-1) defines DCT-II for both horizontal transform type and vertical transform type. For Transform Group 2, the first transform mode (mode 2-1) defines DST-VII for both horizontal transform and vertical transform, the second transform mode (mode 2-2) defines DCT-II for horizontal transform and DST-VII for vertical transform, and the third transform mode (mode 2-3) defines DST-VII for horizontal transform and DCT-II for vertical transform.

The transform modes in the Group 1 and Group 2 are different from each other. An AMT flag (also referred to as transform flag) is signaled to indicate a particular transform group. If the number of transform modes in the particular transform group is larger than 1, an additional transform index may be signaled to indicate one transform mode.

In some embodiments, a transform group is implicitly assigned or selected according to predetermined criteria such that the AMT flag is not signaled. In some embodiments, the transform mode is implicitly assigned or selected according to the predetermined criteria such that neither the AMT flag nor the AMT index is signaled. The predetermined criteria is based on the applied Intra prediction mode of the current block.

In some embodiments, Multiple Transform Selection (MTS) is used to define the transform settings for residual coding for intra and/or inter coded blocks. MTS uses transform modes selected from the DCT/DST families or transform types, including Discrete Sine Transform type VII (DST-VII) and/or Discrete Cosine Transform type VIII (DCT-VIII).

In some embodiments, multiple transform modes used in MTS are indicated with an index. In some embodiments, a transform mode may assign one transform type for horizontal transform and one transform type for vertical transform.

Figure 3B:
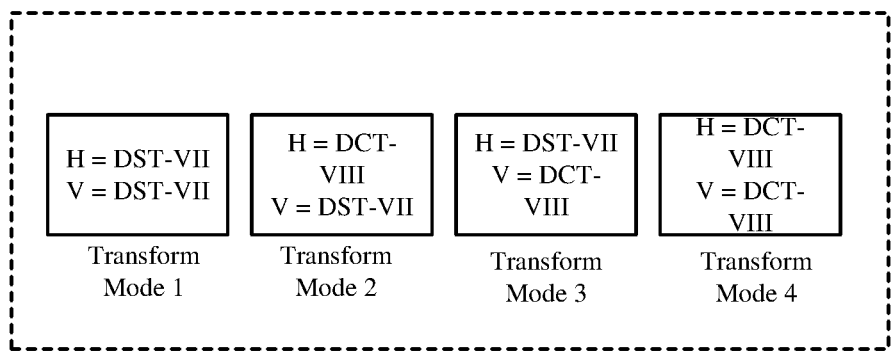
FIG. 3B illustrates an example Multiple Transform Selection (MTS) scheme.

FIG. 3B illustrates an example MTS scheme 300B. The example MTS 300B uses only transform types DST-VII and DCT-VIII. A default mode (not illustrated) defines DCT-II for both horizontal and vertical transform. The MTS scheme 300B defines four additional transform modes 1 through 4. Transform mode 1 defines DST-VII for both horizontal transform type and vertical transform type. Transform mode 2 defines DCT-VIII for horizontal transform type and DST-VII for vertical transform type. Transform mode 3 defines DST-VII for horizontal transform type and DCT-VIII for vertical transform type. Transform mode 4 defines DCT-VIII for both horizontal transform and vertical transform. The transform modes are different from each other. An MTS index is signaled to indicate a particular transform mode.

In some embodiments, a transform mode is implicitly assigned or selected according to predetermined criteria such that the MTS index is not signaled. The predetermined criteria is based on the applied Intra prediction mode of the current block.

II. Intra Prediction Modes

HEVC defines 33 directional modes for intra prediction, in addition to DC and planar modes. In some embodiments, in order to improve intra prediction and to capture finer edge directions presented in natural videos, intra prediction is defined to have 65 directional modes, in addition to DC and planar modes. The denser directional intra prediction modes can be applied to all block sizes and both luma and chroma intra predictions.

Figure 4:
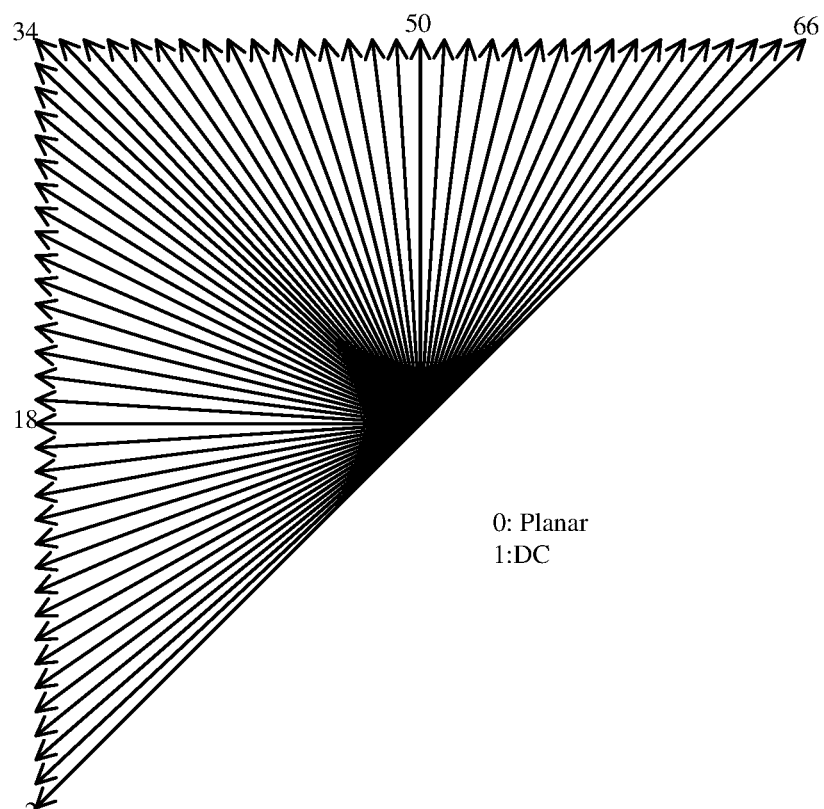
FIG. 4 illustrates the intra prediction modes for coding a block of pixels.

FIG. 4 illustrates the 67 intra prediction modes for coding a block of pixels. According to the figure, intra prediction mode 0 corresponds to planar mode, intra prediction mode 1 corresponds to DC mode, and intra prediction modes 2-66 correspond to angular intra prediction modes, or directional modes. Among the directional modes, mode 2 correspond to bottom-left direction, mode 18 corresponds to Horizontal or left direction, mode 34 corresponds to Diagonal or top-left direction, mode 50 corresponds to Vertical or top direction, mode 66 corresponds to Vertical Diagonal or top-right direction.

In some embodiments, a mode-dependent transform candidate selection process is used to account for different residual statistics of different intra prediction modes. In some embodiments, each of the intra prediction modes are assigned a set of candidate transforms, i.e., the set of candidate transforms are selected based on the intra prediction mode. In some embodiments, a horizontal transform and a vertical transform are selected from the set of candidate transforms assigned to an intra prediction mode. Table 1 lists three pre-defined sets of candidate transforms, each set of candidate transforms may serve as a vertical transform set or a horizontal transform set. Table 2 lists 67 intra prediction modes and their assigned sets of candidate transforms. When intra-predicting the block of pixels with a particular intra prediction mode, the video coder uses table 2 to identify the transform set based on the particular intra prediction mode. The video coder then uses a transform index (or AMT index) to select one transform mode from the vertical transform set and one transform mode from the horizontal transform set. The transform index may be explicitly coded in a bitstream as a syntax element.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 2

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 27 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

TABLE 2-continued

Selected (H)orizontal and (V)ertical transform sets for each intra prediction mode

| | Intra Mode | | | | | | | | | | | | | |
|---|---|---|---|---|---|---|---|---|---|---|---|---|---|---|
| | 53 | 54 | 55 | 56 | 57 | 58 | 59 | 60 | 61 | 62 | 63 | 64 | 65 | 66 |
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

III. Most Probable Modes (MPMs)

In some embodiments, a list of Most Probable Modes (MPMs) is used to encode intra prediction mode for Luma components of a block. The list of MPMs is a list of candidate modes that is generated based on the intra prediction modes used by neighboring blocks (or neighboring modes) of the current block. When a block of pixels is coded by intra prediction and a prediction mode is selected as the current intra prediction mode for the current block, truncated unary coding may be used to indicate the current intra prediction mode if the current intra prediction mode is in the MPM list. If the current intra prediction mode is not in the MPM list, fixed length code or truncated binarization may be used to indicate the current intra prediction mode.

In some embodiments, intra prediction modes included in an MPM list may be classified into three groups: neighboring intra modes, derived intra modes, and default intra modes. In some embodiments, intra prediction modes of five neighboring blocks (or neighboring modes) are used to form the MPM list. The locations of the 5 neighboring modes includes left (L), above (A), below-left (BL), above-right (AR), and above-left (AL). An initial MPM list is formed by inserting intra prediction modes from the five neighboring modes, the planar mode, and the DC modes into the MPM list. A pruning process is used to remove duplicated intra prediction modes so that only unique modes are included in the MPM list. The order of the intra prediction modes in the initial MPM list may be left, above, planar, DC, below-left, above-right, and then above-left.

If the MPM list is not full (e.g., there are less than 6 MPM candidates in the list), one or more derived intra modes may be added. A derived intra mode may be obtained by adding −1 or +1 to an angular directional mode (an intra prediction mode that is not DC or planar) that is already included in the MPM list. Such an additional derived mode may not be generated from a non-angular intra prediction modes (DC or planar). If the MPM list is still not complete, one or more default modes are added to the MPM list according to the following order: vertical, horizontal, mode 2, and diagonal mode. As a result of this process, a unique list of 6 MPM candidate modes is generated.

The coding for selection of the remaining 61 intra prediction modes that are not in the MPM list (non-MPMs) is as follows. The 61 non-MPMs are divided into two mode sets: a selected mode set and a non-selected mode set. The selected mode set includes 16 modes; the remaining 45 modes are assigned to the non-selected mode set. The mode set (set of selected modes or set of non-selected modes) that includes the current mode (i.e., the intra prediction mode selected to code the current block) may be indicated in the bitstream with a flag. If the current mode is within the selected mode set, the current mode is signaled by a 4-bit fixed-length code. If the current mode is from the non-selected mode set, the current mode is signaled by a truncated binary code. In some embodiments, the selected mode set is generated by sub-sampling the 61 non-MPM modes according to the following:

Selected mode set={0, 4, 8, 12, 16, 20 . . . 60}
Non-selected mode set={1, 2, 3, 5, 6, 7, 9, 10 . . . 59}

IV. Implicitly Signaling of Transform Settings Based on Intra Prediction

In some embodiments, the video coder forgoes explicit signaling of transform settings and instead uses implicit indications based on intra prediction settings, including planar mode, DC mode, and angular directional modes.

In general, the finer the intra prediction, the less difference among adjacent directional predictors of intra prediction. The video coder may assign different transform settings to adjacent angular directional modes, e.g., based on similarity of predictors between adjacent directional modes. The video coder may also map planar mode and DC mode to transform settings depending on texture characteristic. When DC mode is selected for intra prediction and may be implicitly assigned with or mapped to a default transform type such as DCT-II. With the proposed implicit assignment, both Intra prediction mode and transform mode are signaled at the same time using the Intra prediction mode coding. When a video encoder tests different Intra prediction modes to find the most suitable intra prediction mode, the corresponding choice for transform settings can be determined at the same time without extra coding pass and complexity.

In some embodiments, predetermined criteria is used to define a collection of Intra prediction modes, which are implicitly assigned with or mapped to one particular transform group or one particular transform mode. The collection of intra prediction modes specifies the indices of the intra prediction modes that satisfy the predetermined criteria. The collection of intra prediction modes may be specified by a table with fixed entries. The table may contain entries of different intra prediction modes, e.g., {2, Horizontal, Diagonal, Vertical, Vertical diagonal}, or any other subset of these five prediction modes. The defined collection of intra prediction modes may be implicitly assigned with or mapped to one transform group, such as Transform Group 1. The predetermined collection of intra prediction modes may also be implicitly assigned with one transform mode, such as DCT-II for both horizontal transform and vertical transform. The Intra prediction modes that are not in the defined collection of intra prediction modes may be implicitly assigned with another transform group, such as Transform Group 2 or another transform mode, such as DST-VII for both horizontal transform and vertical transform.

In some embodiments, the defined collection of intra prediction modes may be specified by a set of fixed entries of intra prediction modes such as {2, Horizontal, Diagonal, Vertical, Vertical Diagonal} or any other subset of these five directional modes±offset, where offset can be predetermined or adaptively decided. For example, if the set of fixed entries is {Diagonal}±1 and if the index for the diagonal intra prediction mode is 34, then intra prediction modes 33 and 35 are implicitly assigned with one transform group (such as Transform Group 1) or one transform mode (such as DCT-II for both horizontal transform and vertical transform) while other Intra prediction modes are implicitly assigned with another transform group (such as Transform Group 2) or another transform mode (such as DST-VII for both horizontal transform and vertical transform).

The defined collection of intra prediction modes that are implicitly assigned with a transform group or a transform mode may also be specified by a fixed expression or equation such as {intra prediction modes % N==n}, where N and n are predetermined, or {intra prediction modes % N==n}, where N is predetermined and n can be changed depending on the applied Intra prediction mode, etc. For example, the fixed equation may be {intra prediction modes % 2==1}. The intra prediction modes 3, 5, 7, . . . , 65 are then implicitly assigned with one transform group or one transform mode while the other Intra prediction modes are implicitly assigned with another transform group or another transform mode. For another example, the fixed equation may be {intra prediction modes % 2==n}, n is 0 for Intra prediction modes less than a particular threshold (e.g., the index of the diagonal mode or 34); otherwise, n is 1. Intra prediction modes 0, 2, 4, 6, . . . 32, 35, 37, 39, . . . 63, 65 are then implicitly assigned with one transform group or one transform mode while the other intra prediction modes are implicitly assigned with another transform group or another transform mode.

In some embodiments, the horizontal transform type for the intra prediction modes in the defined collection of intra prediction modes are the same as the vertical transform type for the intra prediction modes that are not in the defined collection of intra prediction modes, while the vertical transform type for the intra prediction modes in the define collection of intra prediction modes are the same as the horizontal transform type for the intra prediction modes that are not in the defined collection of intra prediction modes. For example, for the intra prediction modes in the defined collection, the horizontal transform type may be DST-VII and the vertical transform type may be DCT-II, while for intra prediction modes not in the defined collection, the horizontal transform type may be DCT-II and the vertical transform type may be DST-VII.

In some embodiments, blocks with different block sizes may use different equations or expressions for defining the collection of intra prediction modes that are implicitly assigned with transform groups or transform modes. In some embodiments, blocks applying intra prediction modes that are in different numerical ranges may use different equations or expressions for defining the collection of intra prediction modes that are implicitly assigned with transform groups or transform modes. For example, when the applied Intra prediction mode of a block is within a particular numerical range, such as a range of directional modes around the Diagonal (e.g., [34−d, 34+d], where d is a positive integer), the fixed equation may be {2, Horizontal, Diagonal, Vertical, vertical diagonal} or any other subset of these five intra prediction modes±offset, where offset can be predetermined or adaptively decided. When the applied Intra prediction mode is not in that predetermined range, the fixed equation may be {intra prediction modes % N==n}, where N is predetermined and n may be changed depending on the applied Intra prediction mode. In other words, different fixed equations or expressions are used to assign intra prediction modes in different numerical ranges to transform modes or transform groups.

In some embodiments, the defined collection of intra prediction modes that are implicitly assigned with a transform group or a transform mode may be specified by texture characteristic. A block having uniform texture may be implicitly assigned one transform group (e.g., Transform Group 1) or one transform mode (e.g., DCT-II) while a block not having uniform texture may be implicitly assigned another transform group (e.g., Transform Group 2) or another transform mode (e.g., DST-VII). A video coder may determine texture uniformity by determining whether the applied Intra prediction mode of the block is DC mode. If DC mode is the applied Intra prediction mode, the block texture is assumed to be uniform, and the block is implicitly assigned Transform Group 1 or DCT-II, i.e., DC mode is implicitly assigned with Transform Group 1 or DCT-II. For another example, when the applied intra prediction mode of the block is planar mode, the block texture is assumed to be more complex, and the block is implicitly assigned Transform Group 2 or DST-VII, i.e., planar mode is implicitly assigned with Transform Group 2 or DST-VII.

In some embodiment, the defined collection of intra prediction modes that are implicitly assigned with a transform group or a transform mode may be specified based on intra prediction modes of neighboring blocks. For example, the intra prediction modes in the MPM list of the current clock may be implicitly assigned with one transform group (e.g., Transform Group 1) or one transform mode (e.g., DCT-II for both horizontal transform and vertical transform) while the intra prediction modes that are not in the MPM list may be implicitly assigned with another transform group (e.g., Transform Group 2) or another transform mode (e.g., DST-VII for both horizontal transform and vertical transform). For another example, the prediction modes of the left neighboring block or of the left-extended neighboring block (e.g., below-left neighboring block) may be implicitly assigned with one transform group or one transform mode. The prediction modes from above neighboring block or above-extended neighboring block (e.g., above-right neighboring block) may be implicitly assigned with another transform group or another transform mode. The prediction modes from above-left neighboring block may be implicitly assigned with another transform group or another transform mode.

In some embodiments, the transform types in one transform group may be changed based on block size. In some embodiments, a transform mode in Transform Group 1 and a transform mode in Transform Group 2 may be swapped based on certain criteria. For example, when the block size is smaller than a particular threshold, a transform mode in Transform Group 2 is exchanged with a transform mode in Transform Group 1. For the example AMT scheme of FIG. 3A, the only transform mode (mode 1-1) in Transform Group 1 is to be changed to DST-VII for both horizontal transform and vertical transform and the first transform mode (mode 2-1) in Transform Group 2 is to be changed to DCT-II for both horizontal transform and vertical transform.

In some embodiments, for each transform group, the combination of the transform type for horizontal transform and the transform type for vertical transform may be changed based on the applied intra prediction mode, such as whether the applied intra prediction mode is an odd (or even) indexed angular mode. For example, if the applied intra prediction mode is an odd number, for Transform Group 2 of FIG. 3A, the second transform mode (mode 2-2) may be changed to DST-VII for horizontal transform type and DCT-II for vertical transform type, the third transform mode (mode 2-3 may be changed to be DCT-II for horizontal transform type and DST-VII for vertical transform type.

V. Example Video Encoder

Figure 5:
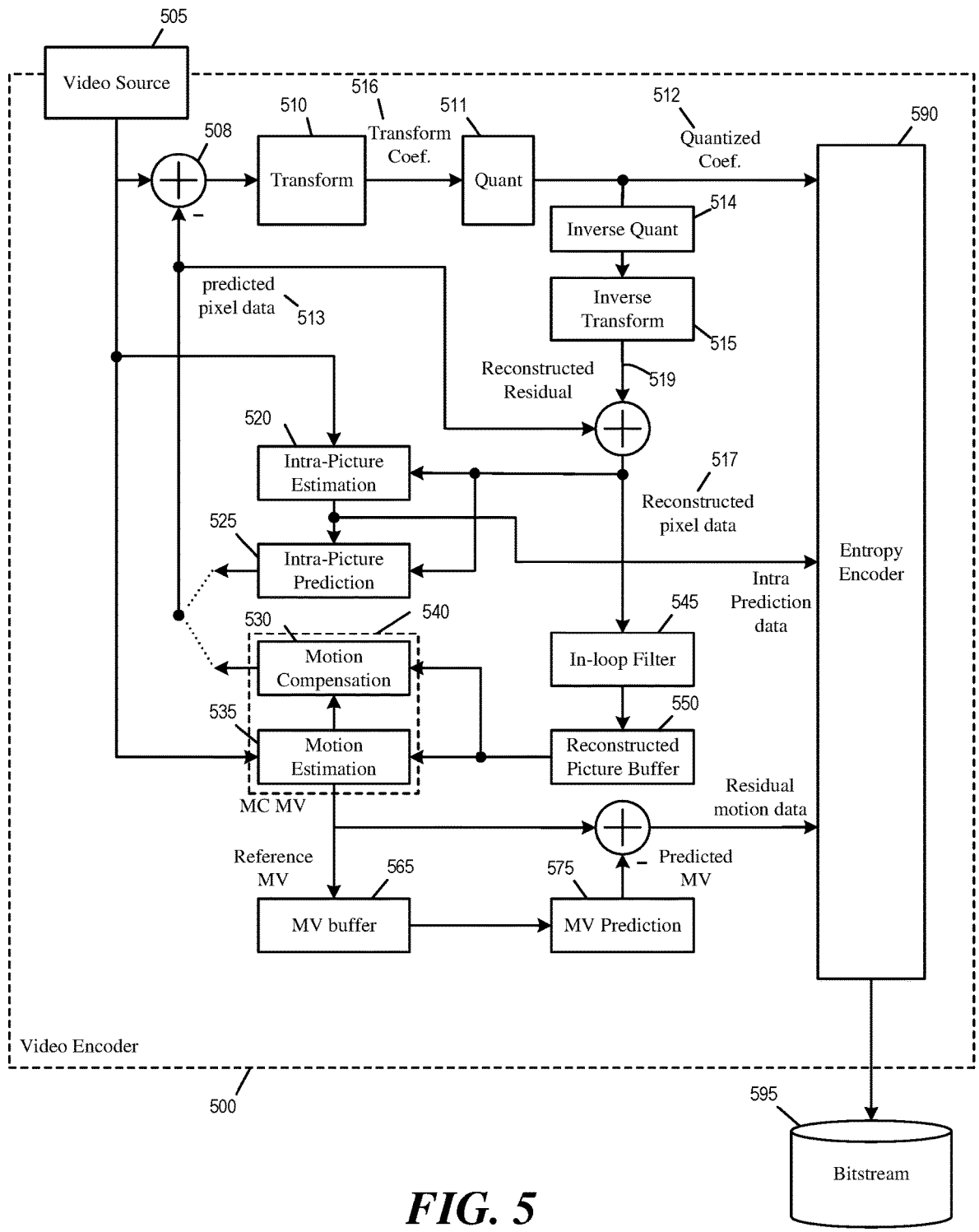
FIG. 5 illustrates an example video encoder that may implement implicit signaling of transform settings based on intra prediction settings.

FIG. 5 illustrates an example video encoder 500 that may implement implicit signaling of transform settings based on intra prediction settings. For some embodiments, the video encoder 500 may implement the video encoder 100 of FIG. 1. As illustrated, the video encoder 500 receives input video signal from a video source 505 and encodes the signal into bitstream 595. The video encoder 500 has several components or modules for encoding the signal from the video source 505, including a transform module 510, a quantization module 511, an inverse quantization module 514, an inverse transform module 515, an intra-picture estimation module 520, an intra prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra prediction module 525. The transform module 510 converts the difference (or the residual pixel data or residual signal 509) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a line buffer (not illustrated) for intra-picture prediction and spatial MV prediction. The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra prediction based on the reconstructed pixel data 517 to produce intra prediction data. The intra prediction data is provided to the entropy encoder 590 to be encoded into bitstream 595. The intra prediction data is also used by the intra prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 6:
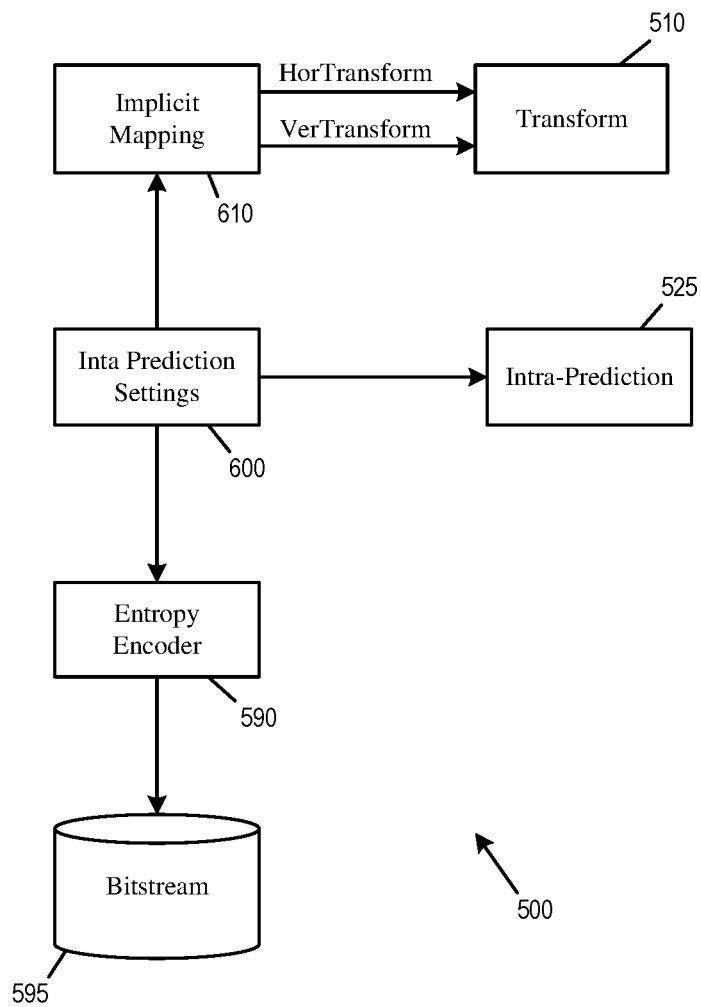
FIG. 6 illustrates portions of the video encoder that implement implicit derivation of transform settings based on intra prediction settings.

FIG. 6 illustrates portions of the video encoder 500 that implement implicit derivation of transform settings based on intra prediction settings. As illustrated, intra prediction settings 600 control the operations of the intra prediction module 525. The intra prediction settings specify an intra prediction mode that is selected from DC mode, planar mode, and multiple different directional/angular modes. Intra prediction modes are described in Section II above.

An implicit mapping module 610 receives the intra prediction settings 600 and maps the received intra prediction settings to transform settings for the transform module 510. The transform settings may include a transform mode or transform types for a vertical transform and a horizontal transform. The transform types may be selected from various versions of DCT or DST such as DCT-II, DST-VII, DCT-VIII, DST-I, and DCT-V or any subset of the above types. The transform module 510 in turn performs transform on the prediction residuals of the block based on the derived transform settings.

The entropy encoder 590 also receives the intra prediction settings 600 and encodes at least some of the prediction settings 600 as syntax element in the bitstream 595. Alternatively, in some examples, the intra prediction settings 600 may be implicit signaled (i.e., not encoded in the bitstream) and can be implicitly derived by video decoders. The derived transform settings are not encoded in the bitstream. The mapping of the transform settings from the intra prediction settings is described in Section IV above.

Figure 7:
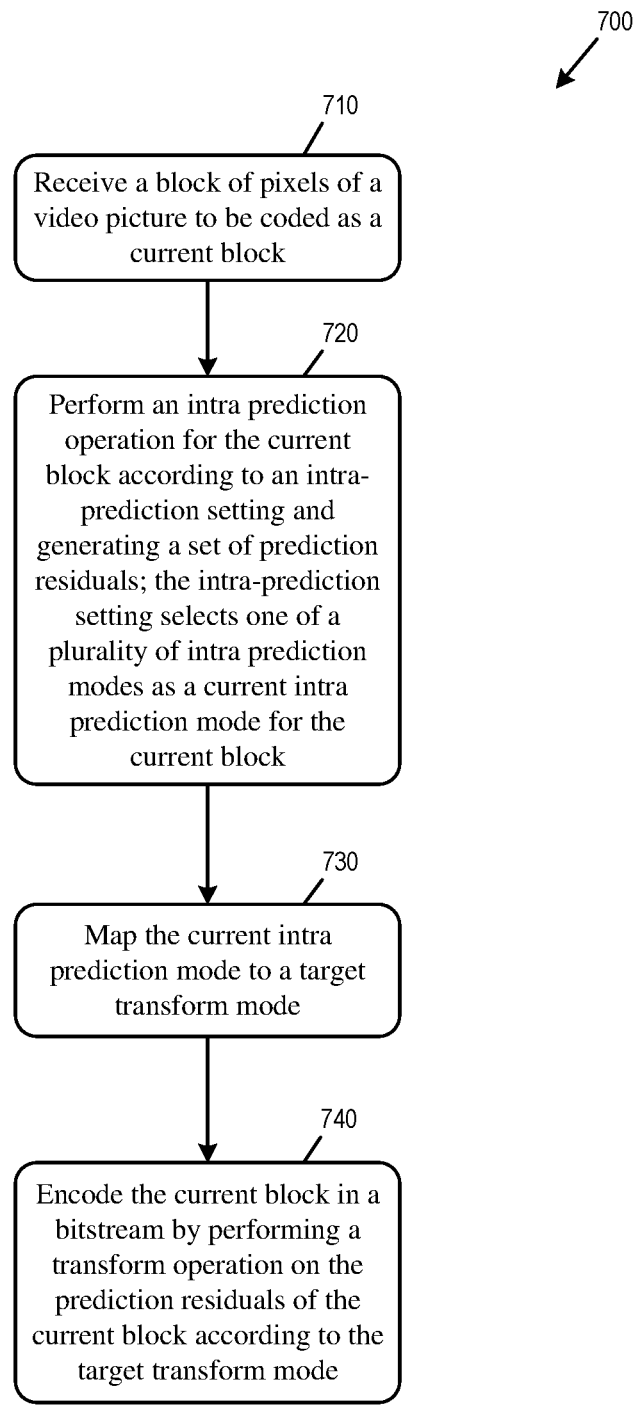
FIG. 7 conceptually illustrates a video encoding process that implicitly signals transform settings based on intra prediction settings.

FIG. 7 conceptually illustrates a video encoding process 700 that implicitly signals transform settings based on intra prediction settings. In some embodiments, one or more processing units (e.g., a processor) of a computing device implementing the video encoder 500 performs the process 700 by executing instructions stored in a computer readable medium. In some embodiments, an electronic apparatus implementing the video encoder performs the process 700.

The video encoder receives (at step 710) a block of pixels of a video picture to be coded as a current block. The current block may be a CU, PU, or CTU of a video picture in a video sequence. The video encoder may receive the block of pixels from a video source.

The video encoder performs (at step 720) an intra prediction operation for the current block according to an intra prediction setting and generate a set of prediction residuals (or residual pixels). The intra prediction setting selects an intra prediction mode from a plurality of intra prediction modes as the current intra prediction mode for the current block. The intra prediction operation generates a set of prediction pixels by referencing pixels neighboring the current block in different directions according to the current intra prediction mode. The set of prediction residuals (or residual pixels) is generated based on the difference between the set of prediction pixels and the raw pixels of the current block. The intra prediction setting may be specified by a rate-distortion control operation. The intra prediction mode is selected from DC mode, planar mode, and multiple different directional/angular modes. Intra prediction modes are described in Section II above.

The video encoder maps (at step 730) the current intra prediction mode to a target transform mode. The target transform mode may specify a horizontal transform type and a vertical transform type. In some embodiments, a collection of intra prediction modes are assigned with a particular transform mode, such that the target transform mode is the particular transform mode when the current intra prediction mode is in the collection of intra prediction modes. The collection of intra prediction modes may be defined by a fixed expression, such that different blocks with different block sizes have different fixed expression for defining the collection of intra prediction modes, or such that different fixed expressions are used to assign intra prediction modes in different numerical ranges with transform modes. In some embodiments, intra prediction modes in a most probable mode (MPM) list of the current block are assigned with a particular transform mode. In some embodiments, an intra prediction mode indicative of uniform block texture, such as DC mode, is mapped to a particular transform mode. The MPM are described in Section III below. The mapping of intra prediction settings to transform settings is described in greater detail in Section IV below.

The video encoder encodes (at step 740) the current block in a bitstream by performing a transform operation on the prediction residuals of the current block according to the target transform mode. The prediction residuals of the current block are transformed into transform coefficients by the transform operation. The transform coefficients are entropy coded as syntax element of the bitstream. The target transform mode is not encoded in the bitstream as a syntax element. In some embodiments, the intra prediction setting is also encoded in the bitstream as a syntax element.

VI. Example Video Decoder

Figure 8:
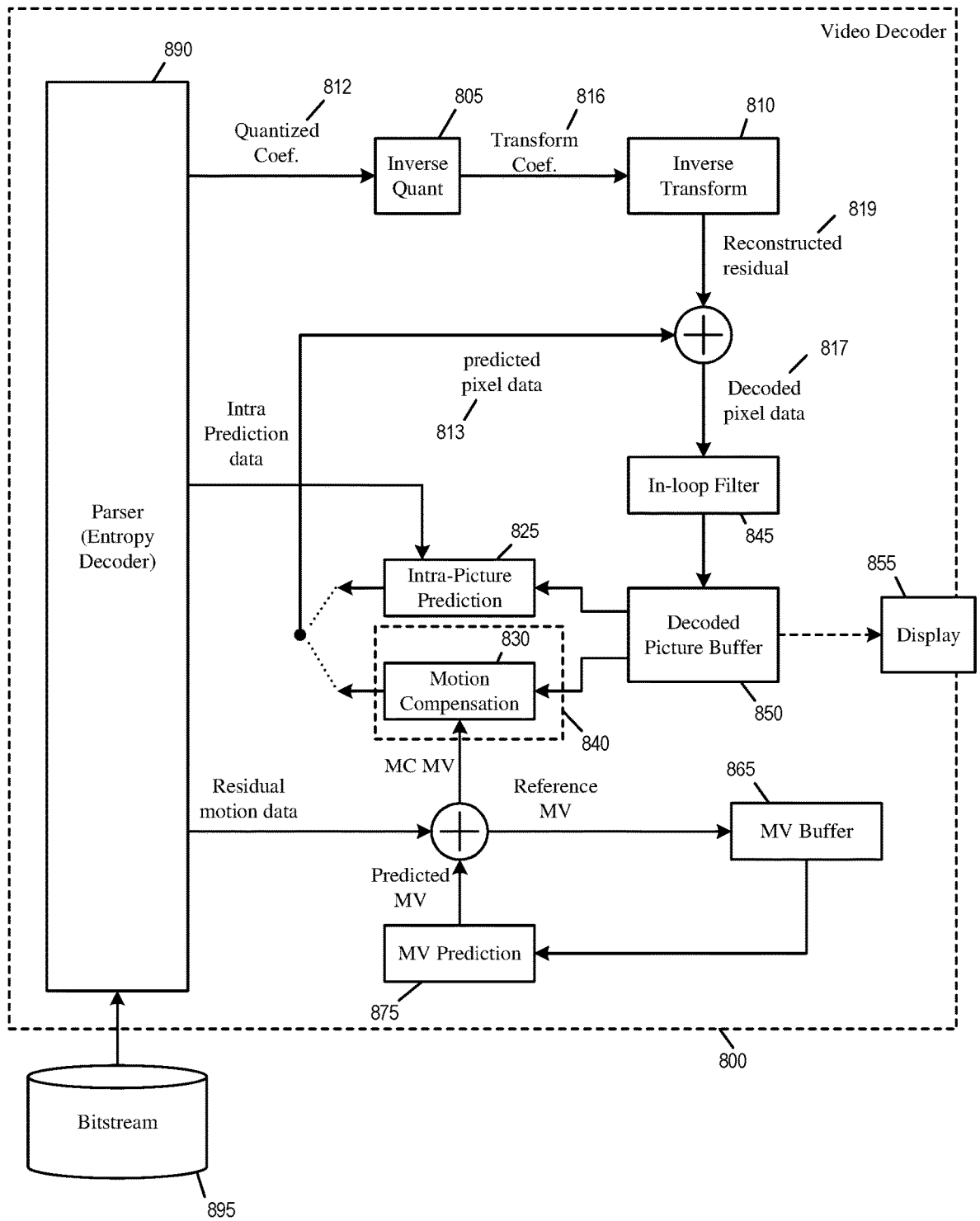
FIG. 8 illustrates an example video decoder that may implicitly signal transform settings based on intra prediction settings.

FIG. 8 illustrates an example video decoder 800 that may implicitly signal transform settings based on intra prediction settings. In some embodiments, the video decoder 800 may implement the video decoder 200 of FIG. 2. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including an inverse quantization module 805, an inverse transform module 810, an intra prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 805 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra prediction module 825 receives intra prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly, or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
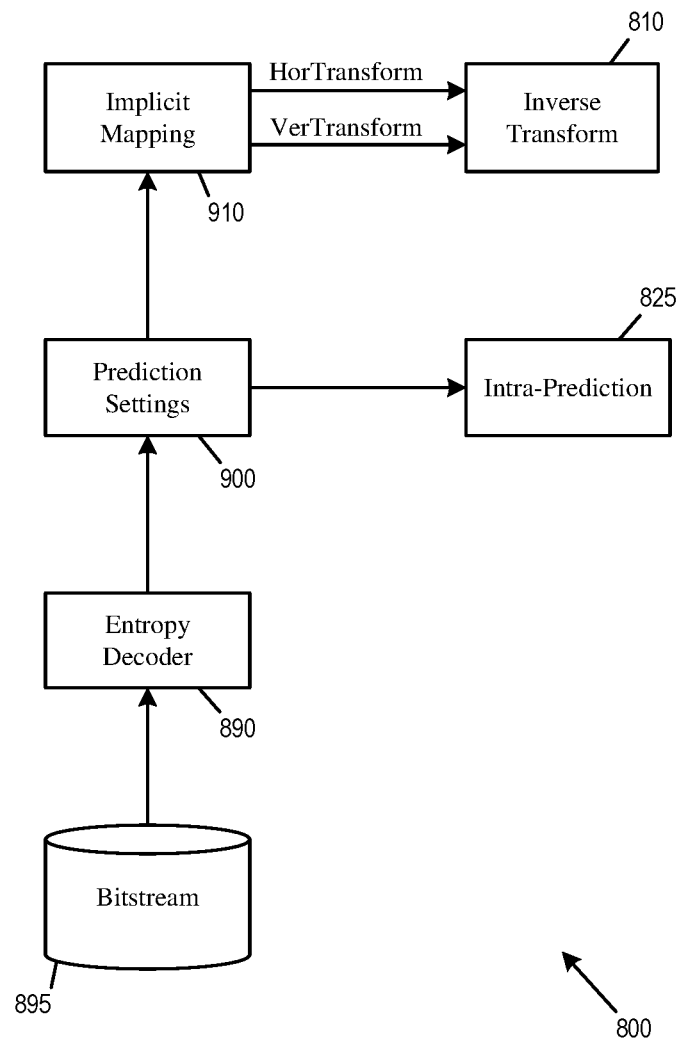
FIG. 9 illustrates portions of the video decoder that implement implicit derivation of transform settings based on intra prediction settings.

FIG. 9 illustrates portions of the video decoder 800 that implement implicit derivation of transform settings based on intra prediction settings. As illustrated, intra prediction settings 900 control the operations of the intra prediction module 825. The intra prediction settings specify an intra prediction mode that is selected from DC mode, planar mode, and multiple different directional/angular modes. However, in some examples, the intra prediction settings 900 may be implicit derived by the video decoder 800 (i.e., not encoded in the bitstream 895). Intra prediction modes are described in Section II above.

An implicit mapping module 910 receives the intra prediction settings 900 and maps the received intra prediction settings to transform settings for the inverse transform module 810. The transform settings may include a transform mode or transform types for a vertical transform and a horizontal transform. The transform types may be selected from various versions of DCT or DST such as DCT-II, DST-VII, DCT-VIII, DST-I, and DCT-V, or any subset of the above types. The inverse transform module 810 in turn performs transform on the prediction residuals of the block based on the derived transform settings.

The intra prediction settings 900 are parsed out from the bitstream 895 by the entropy decoder 890 as syntax elements. The mapping of the transform settings from the intra prediction settings is described in Section IV above.

Figure 10:
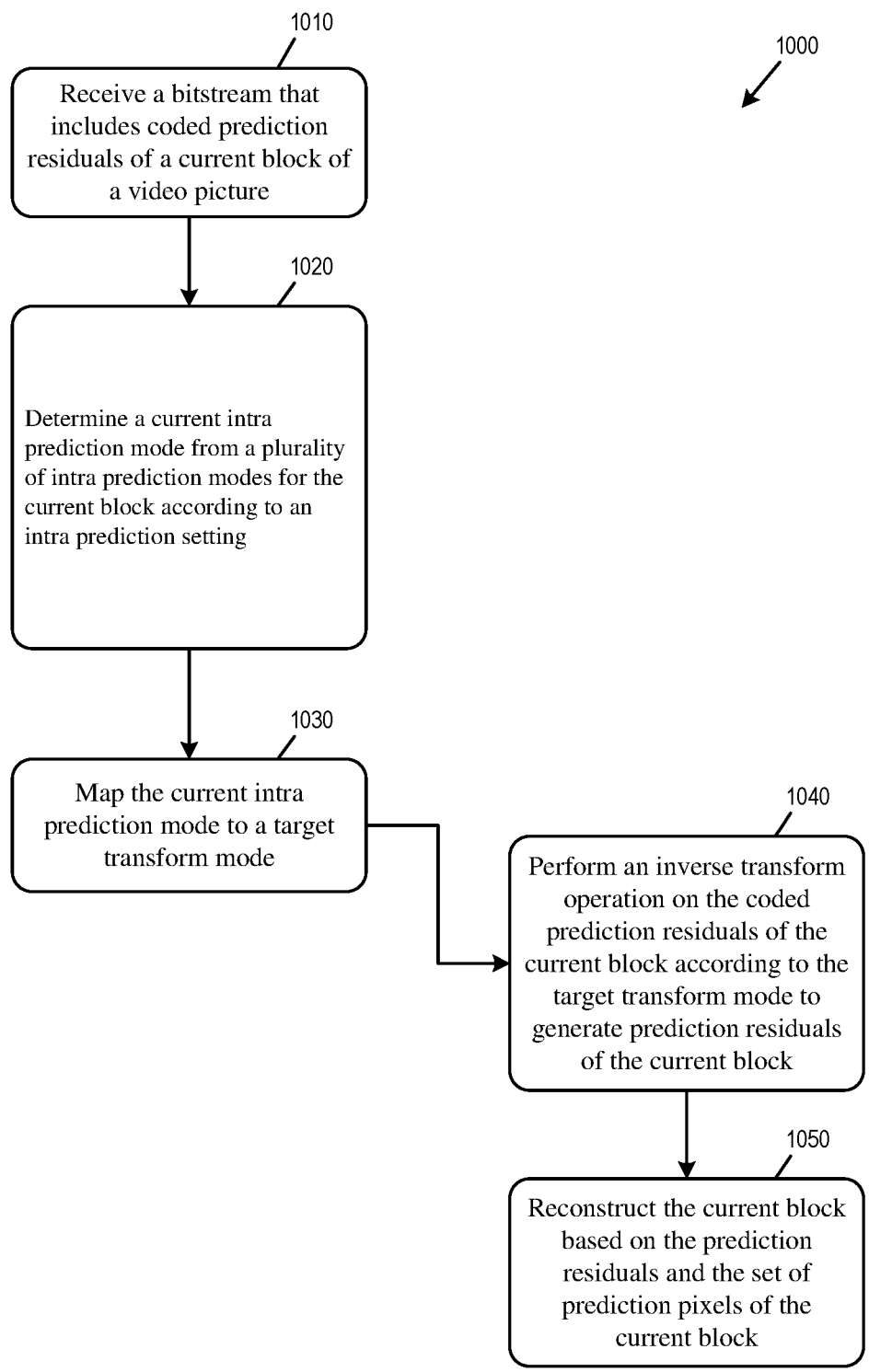
FIG. 10 conceptually illustrates a video decoding process that implicitly decides transform settings based on intra prediction settings.

FIG. 10 conceptually illustrates a video decoding process 1000 that implicitly decides transform settings based on intra prediction settings. In some embodiments, one or more processing units (e.g., a processor) of a computing device implementing the video decoder 800 performs the process 1000 by executing instructions stored in a computer readable medium. In some embodiments, an electronic apparatus implementing the video decoder performs the process 1000.

The video decoder receives (at step 1010) a bitstream that includes coded prediction residuals (e.g., transform coefficients) of a current block of a video picture. The current block may be a CU, PU, or CTU of a video picture in a video sequence.

The video decoder determines (at step 1020) a current intra prediction mode from a plurality of intra prediction modes for the current block according to an intra prediction setting. The intra prediction setting may be explicitly signaled by syntax elements of the bitstream. The intra prediction mode is selected from DC mode, planar mode, and multiple different directional/angular modes. Alternatively, the intra prediction setting may be implicitly derived by the video decoder. Intra prediction modes are described in Section II above.

The video decoder maps (at step 1030) the current intra prediction mode to a target transform mode. The target transform mode may specify a horizontal transform type and a vertical transform type. In some embodiments, a collection of intra prediction modes are assigned with a particular transform mode, such that the target transform mode is the particular transform mode when the current intra prediction mode is in the collection of intra prediction modes. The collection of intra prediction modes may be defined by a fixed expression, such that different blocks with different block sizes have different fixed expression for defining the collection of intra prediction modes, or such that different fixed expressions are used to assign intra prediction modes in different numerical ranges with transform modes. In some embodiments, intra prediction modes in a most probable mode (MPM) list of the current block are assigned with a particular transform mode. In some embodiments, an intra prediction mode indicative of uniform block texture, such as DC mode, is mapped to a particular transform mode. The MPM are described in Section III below. The mapping of intra prediction settings to transform settings is described in greater detail in Section IV below.

The video decoder performs (at step 1040) an inverse transform operation on the coded prediction residuals of the current block according to the target transform mode to generate prediction residuals of the current block. The coded prediction residuals (or transform coefficients) are entropy decoded from syntax elements of the bitstream. The video decoder reconstructs (at step 1050) the current block based on the prediction residuals and a set of prediction pixels of the current block, e.g., by adding the set of residual pixels and the set of prediction pixels. To be specific, an intra prediction operation generates the set of prediction pixels by referencing pixels neighboring the current block in different directions according to the current intra prediction mode. The current intra prediction mode is one of DC mode, planar mode, and multiple different directional/angular modes. Intra prediction modes are described in Section II above.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
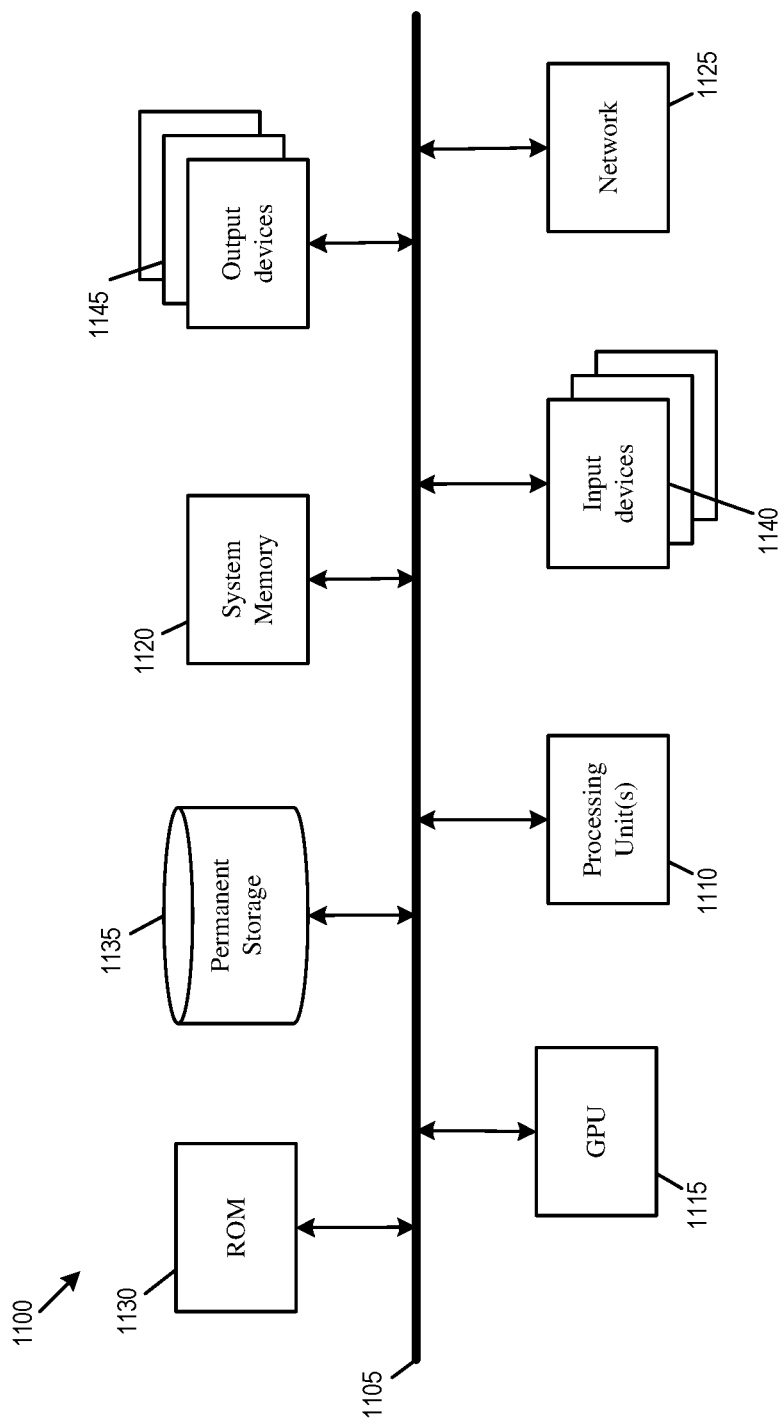
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An encoding method comprising:
   receiving a block of pixels of a video picture to be coded as a current block;
   performing an intra prediction operation for the current block according to an intra prediction setting and generating prediction residuals of the current block, wherein the intra prediction setting selects a current intra prediction mode from a plurality of intra prediction modes for the current block;
   mapping the current intra prediction mode to a target transform mode; and
   encoding the current block in a bitstream by performing a transform operation on the prediction residuals of the current block according to the target transform mode,
   wherein the target transform mode is not encoded in the bitstream as a syntax element, and
   wherein the intra prediction setting is encoded in the bitstream as a syntax element.

2. The method of claim 1, wherein a collection of intra prediction modes are assigned with a particular transform mode, wherein the target transform mode is the particular transform mode when the current intra prediction mode is in the collection of intra prediction modes.

3. The method of claim 2, wherein the collection of intra prediction modes is based on a set of intra prediction modes in a bottom left-direction, a left direction, a top-left direction, a top direction, and a top-right direction.

4. The method of claim 2, wherein the collection of intra prediction modes is defined by a fixed expression, wherein different blocks with different block sizes have different fixed expressions for defining different collections of intra prediction modes.

5. The method of claim 2, wherein the collection of intra prediction modes is defined by a fixed expression, wherein different fixed expressions are used to assign intra prediction modes in different numerical ranges with transform modes.

6. The method of claim 1, wherein intra prediction modes in a most probable mode (MPM) list of the current block are assigned with a particular transform mode, wherein intra prediction modes in the MPM list of the current block are defined based on intra prediction modes of blocks neighboring the current block.

7. The method of claim 1, wherein an intra prediction mode indicative of uniform block texture is mapped to a particular transform mode.

8. The method of claim 1, wherein the target transform mode specifies a horizontal transform type and a vertical transform type.

9. An electronic apparatus comprising:
an encoder circuit capable of:
receiving a block of pixels of a video picture to be coded as a current block;
performing an intra prediction operation for the current block according to an intra prediction setting and generating prediction residuals of the current block, wherein the intra prediction setting selects a current intra prediction mode from a plurality of intra prediction modes for the current block;
mapping the current intra prediction mode to a target transform mode; and
encoding the current block in a bitstream by performing a transform operation on the prediction residuals of the current block according to the target transform mode,
wherein the target transform mode is not encoded in the bitstream as a syntax element, and
wherein the intra prediction setting is encoded in the bitstream as a syntax element.

10. A decoding method, comprising:
receiving a bitstream comprising coded prediction residuals of a current block of a video picture;
determining a current intra prediction mode from a plurality of intra prediction modes for the current block according to an intra prediction setting;
mapping the current intra prediction mode to a target transform mode; and
decoding the current block by performing an inverse transform operation on the coded prediction residuals of the current block according to the target transform mode to generate prediction residuals of the current block,
wherein the target transform mode is implicitly derived, and
wherein the intra prediction setting is parsed from the bitstream.

11. The method of claim 10, wherein a collection of intra prediction modes are assigned with a particular transform mode, wherein the target transform mode is the particular transform mode when the current intra prediction mode is in the collection of intra prediction modes.

12. The method of claim 10, wherein the target transform mode specifies a horizontal transform type and a vertical transform type.

13. An electronic apparatus comprising:
a decoder circuit capable of:
receiving a bitstream comprising coded prediction residuals of a current block of a video picture;
determining a current intra prediction mode from a plurality of intra prediction modes for the current block according to an intra prediction setting;
mapping the current intra prediction mode to a target transform mode; and
decoding the current block by performing an inverse transform operation on the coded prediction residuals of the current block according to the target transform mode to generate prediction residuals of the current block,
wherein the target transform mode is implicitly derived, and
wherein the intra prediction setting is parsed from the bitstream.

* * * * *